June 17, 1947.  P. SCHWARZKOPF  2,422,439
METHOD OF MANUFACTURING COMPOSITE STRUCTURAL MATERIALS
Filed Jan. 29, 1943   2 Sheets-Sheet 1
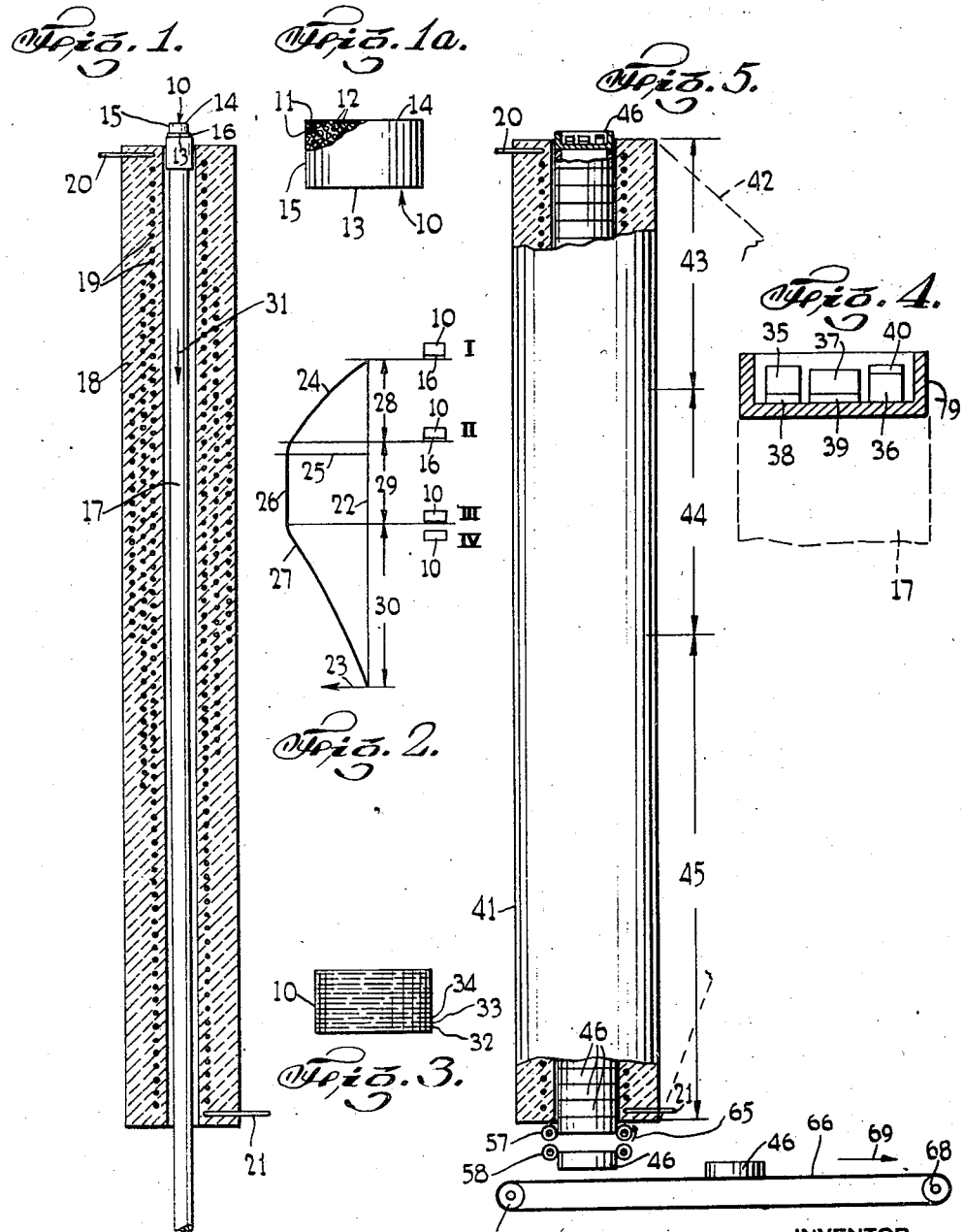
INVENTOR
PAUL SCHWARZKOPF
BY
ATTORNEY June 17, 1947.  P. SCHWARZKOPF  2,422,439
METHOD OF MANUFACTURING COMPOSITE STRUCTURAL MATERIALS
Filed Jan. 29, 1943  2 Sheets-Sheet 2
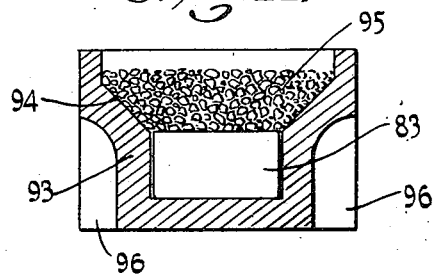
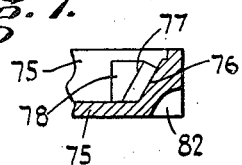
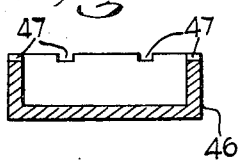
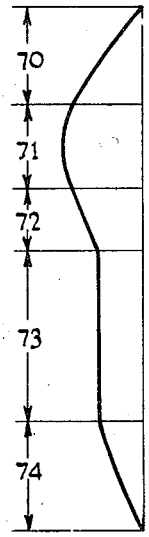
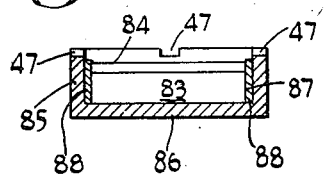
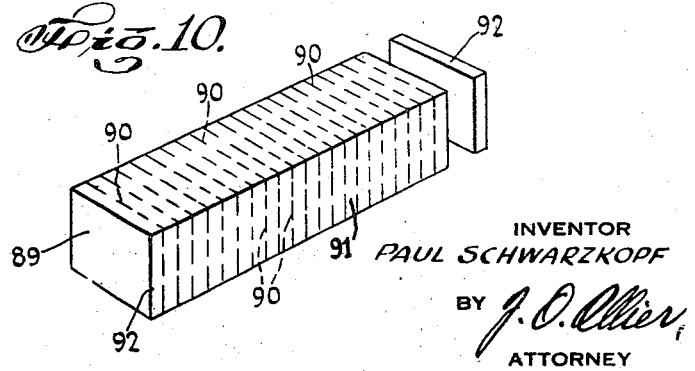
INVENTOR
PAUL SCHWARZKOPF
BY
ATTORNEY Patented June 17, 1947

2,422,439

UNITED STATES PATENT OFFICE 2,422,439

METHOD OF MANUFACTURING COMPOSITE STRUCTURAL MATERIALS

Paul Schwarzkopf, Yonkers, N. Y., assignor to American Electro Metal Corporation, Yonkers, N. Y., a corporation of Maryland Application January 29, 1943, Serial No. 473,954

8 Claims. (Cl. 75—22)

This invention relates to a method of manufacturing composite or agglomerated structural materials and shaped bodies thereof, in particular for bearings, armatures, fixtures and accessories.

Structural composite or agglomerated materials of the type here concerned consist substantially of one or more uniformly distributed particles of metals, metalloids and/or compounds thereof and of one or more relatively lower melting metals or compounds binding or agglomerating the higher melting substance. The higher melting substance is chosen with a view to increasing the life in operation or practical use of the composite structural material eventually obtained, and in particular to resist without melting, softening or deformation the heat developed in practical use, such as by friction in a bearing, or in a valve or valve-seat by a warm or hot medium controlled by the valve, or in a brake or clutch by the wear and heat produced by the use thereof. However, the invention does not differentiate the substance and lower melting metal primarily as to their resistance against mechanical and chemical influences, or electrical conductivity. With the present invention, also the agglomerating metal, metals or compounds thereof can substantially contribute to the wear and chemical resistance of the structural material, or such resistance may not play any decisive role at all, as is the case with fixtures and accessories, such as machine parts of any nature (handles, caps, etc.) and fixtures to be produced according to the invention.

The higher melting substance must be chosen, however, so as to permit the particular manufacture according to the method of the invention, and therefore such that its melting temperature is considerably above the temperatures for melting and overheating the melted, lower melting metal, metals or alloys thereof. It is impossible therefore to definitely group the higher melting substances and lower melting binder materials for all compositions concerned by the invention, because the higher melting substance should be such only relative to a given lower melting metal. Thus copper may form the higher melting substance with respect to lead, tin, zinc and it may form the lower melting metal with respect to nickel, iron, cobalt. Pure iron or low carbon steel can form the higher melting substance with respect to cast iron, and all these kinds of iron can form the higher melting substance e. g. with respect to aluminum.

It will be clear therefore that the particular grouping hereinafter proposed does neither exhaust nor hold for all choices of materials and their combinations coming within the scope of the present invention. With this understanding, higher melting substances may be chosen from a group consisting for instance of iron, steel, alloy steel, stainless steel, cast iron, nickel, nickel-chrome, cobalt, copper, Monel metal, bronzes, Babbitt metals, brass, while binding or agglomerating materials of relatively lower melting temperature than a substance taken from that group may be chosen from cast iron, Babbitt metals, brass, copper, silver, gold, aluminum, lead, tin, cadmium, zinc.

Specifically, if hard metal compositions are manufactured according to this invention, the higher melting substance consists of hard and refractory carbide, boride or nitride particles of elements of the third through sixth group of the periodic system of which are particularly suitable those which are stable up to and melt above about 2000° C., such as the carbides of titanium, tantalum, columbium, tungsten, molybdenum and solid solutions of two or more carbides, whereas the relatively lower melting metals are taken from the iron group, in the first place nickel and cobalt, or selected from steel, alloy steel, bronzes and a cast material containing cobalt, chromium and tungsten (as described for instance in U. S. Patent 1,057,828).

If an electrically conductive composite material is concerned, particularly for electrodes and contacts, the higher melting substance may consist of tungsten, molybdenum, boron, platinum, iridium, osmium, palladium, hafnium, rhenium, tantalum, rhodium, ruthenium, thorium, titanium, vanadium, and electrically conductive and usually high melting compounds thereof, such as their carbides, and also graphite, while the lower melting metal is preferably selected from copper, silver, gold, aluminum, lead, tin, zinc, cobalt, nickel, chromium, beryllium, silicon, iron, and mixtures or alloys thereof.

In selecting higher melting substances and relatively lower melting metals for the purpose of the invention, from the groups stated or otherwise, their mutual wetting qualities are to be considered. Substances of higher melting point and lower melting metals which do not wet one another cannot be used together for the purpose of the invention. Higher melting substances and lower melting metals which serve the purpose of the invention are, by way of exemplification and not limitation, for instance the following. Low carbon steel or alloy steel of low carbon content as higher melting substance, and cast iron with for instance 4% or more carbon as lower melting metal; iron as higher melting substance and major portion by volume and aluminum as lower melting metal and minor portion by volume; nickel as higher melting substance and major portion by volume and aluminum as lower melting metal and minor portion by volume; brass as higher melting substance and major portion by weight and aluminum or zinc as lower melting metal and minor portion; bronze as higher melting substance and tin as lower melting metal; Monel metal as higher melting substance and copper as lower melting metal and minor portion; Babbitt metal as higher melting substance and lead as lower melting metal and minor portion; graphite as higher melting substance and major portion by volume and Babbitt metal as lower melting metal and minor portion by volume; graphite as higher melting substance and in about equal proportions by volume aluminum as lower melting metal; low carbon steel as higher melting substance and copper with a small addition of nickel as lower melting metal and minor portion by weight; silicon as higher melting substance and major portion by volume and copper as lower melting metal and minor portion both by volume and weight; copper as higher melting substance and major portion by volume, and aluminum as lower melting metal and minor portion by volume; copper as higher melting substance and major portion by weight and cadmium as lower melting metal and minor portion by weight.

From the above it will be seen that whenever the higher melting substance is not wetted by the lower melting metal which is desired for any reason, another lower melting metal which wets in its molten state the higher melting substance, can be admixed or alloyed with the main lower melting metal so that the mixture or alloy of the two lower melting metals sufficiently wets the higher melting substance.

As to the ratio of the higher melting substance or substances and lower melting metal or metals, chosen for the purposes of the invention, it should be understood that in general the total by weight of the higher melting substance or substances should amount to a major portion of the body produced, if the average specific weight or density of that substance considerably exceeds the average specific weight or density of the lower melting metal, while that total may amount to both a major or minor portion of the body produced if its average specific weight or density is considerably below that of the lower melting metal or metals. Having this principle in mind, it may be stated that the higher melting substance may amount to from about 10% to about 90% to 95% by weight of the body produced, or the volume of the higher melting substance should form a greater portion of the final, infiltrated body than the volume of the lower melting infiltrant metal.

According to the cognizance of the invention, one reason for the rare use, if any in practice, of the absorption method was that the preformed porous body or pile of the higher melting material necessarily enclosed air in its interstices which was trapped by the absorbed liquid, lower melting metal and resulted in weak spots of the body. The liquefied metal was oxidized by the entrapped air while or after being absorbed; thus oxide films were formed on the outside of the network formed by the absorbed liquefied metal within the continuous pores of the porous body or pile, and those films prevented a firm bond between the absorbed and solidified metal and the particles of the porous body. Another reason for the rejection of the absorption method was that the lower melting metal upon being heated to or above its melting temperature outside the spongy body oxidized superficially; such oxide was then taken along by the liquefied metal into the pores of the body and again prevented the firm bond between the metal and the particles of the body, and weakened the structure of the absorbed metal upon solidification. By using a vacuum the danger of oxidation just described could be reduced to some extent; the absorption process becomes thereby, however, complicated both in equipment and performance, and its cost is materially increased. It would appear that by the use of hydrogen, with or without a vacuum, the known absorption process could be made more efficient; however, the hydrogen would then replace the air in the interstices of the porous body or pile, might be trapped therein and in the liquefied metal, and again a weak body would result.

It is therefore an object of the invention to manufacture composite materials and shaped bodies thereof of the type here concerned by the use of an absorption method without the indicated drawbacks.

It is another object of the invention to produce composite materials and shaped bodies thereof of the type here concerned, by the use of an absorption method without entrapping gases within the liquefied metal and the porous initial body, and thus obtaining a throughout dense and strong body.

It is still another object of the invention to manufacture in a continuous batch-process composite materials and shaped bodies thereof comprised of higher melting metal or substance and lower melting binder metal, such as of the second group mentioned hereinbefore, by the use of an absorption process in such a manner that the final products are dense and substantially free of gaseous, vaporous or detrimental solid enclosures, such as oxides.

These and other objects of the invention will be more clearly understood when the specification proceeds with reference to the drawings in which the manufacture according to the invention is illustrated by way of exemplification.

Fig. 1 shows more schematically in vertical cross section and partly in elevation a heating appliance usable for performing the method of the invention, Fig. 1a on a larger scale a batch, Fig. 2 diagrammatically a mode of heating a batch in different positions within the furnace shaft, Fig. 3 the effect of the particular step of the invention upon that batch, Figs. 4, 6, 7, 8 and 11 in vertical cross section and partly in elevation modifications of a refractory tray with a batch or batches in its, Fig. 5 more schematically in vertical cross section and partly in elevation a furnace shaft and stack of trays traveling therethrough in performing a continuous batch process, Fig. 9 another temperature-traveling path diagram followed according to the invention, and Fig. 10 a perspective view of a prefabricated porous bar to be used with the invention.

Referring to Fig. 1a, a cylindrical body 10 is shown, partly in cross section, consisting of a multitude of powdery higher melting particles 11, such as of carbide, pure iron, low carbon steel, Monel metal, brass, bronze, or Babbitt metal, sometimes with an admixture of finely divided graphite. The minute particles are pressed to shape, in this instance of a cylinder, under a pressure amounting to between about 2000 to 50,000 p. s. i. If the pressed to shape body so obtained is of greater porosity than desired, it may be heated thereafter to a temperature of about 30% to 40% below the melting temperature of the single substance or about 20% to 40% below the melting point of the lowest melting substance comprised by a mixture of such "higher melting" substances. Thereby the body is shrunk and its porosity reduced to a desired degree within relatively small tolerances. It can also be easier handled than a pressed to shape compact. In addition to or instead of determining the porosity by the amount of pressure or the degree and period respectively of temperature and time applied during a kind of presinter given the compact, the particle size of the substance may be adjusted so as to obtain, or to assist in obtaining, the desired porosity. The larger the average particle size, the larger will be the porosity in general. The higher the pressure, or the higher the temperature and/or the longer the period of time of its application upon the compact, the smaller will be the latter's ultimate porosity. A further means for adjusting the porosity consists in admixing a few percent of a volatile matter to the powdery substance before compacting.

According to the method of the invention, rod 17 is positioned in a vertical furnace of any established type for producing in its shaft temperatures corresponding to a law according to the invention. Fig. 1 exemplifies schematically some effective portions of such a furnace. In a tubular portion 18 of refractory and insulating material, a helix of wire or foil 19 of metal of high melting point, such as tungsten or molybdenum, is embedded and connected with terminals 20, 21 for applying a heating current which may be regulated in any known manner. By proper variation of the distance between individual windings of the helix and arranging them in one or more rows, the desired law of heating of the furnace shaft can be realized.

In Fig. 2, curve 24 indicates this law of heating. The ordinate 22 indicates the height of furnace 18, and the abscissa 23 the temperatures produced. It will be seen that the temperatures, starting from the top of the furnace, first increase to a maximum value 25, remain for a certain distance approximately at this value, and then decrease again, first rather steeply and then gently. Assuming that the melting and freezing temperatures of the material of disc 16 are reached respectively at points 26 and 27, a zone 29 results between them of a temperature at which that material is liquid and somewhat overheated. Therefore, if disc 16 is lowered through the furnace tube 18, it is gradually heated in zone 28 to melting temperature, then melted and overheated within zone 29; and in zone 30 the metal of the disc is frozen and cooled down again.

Considering now the right side of Fig. 2, it appears that disk 16 of the infiltrant metal with porous body 10 of the higher melting substance on top, upon lowering of rod 17 in the direction of arrow 31 in Fig. 1, will first arrive in position I in Fig. 2 and enter the furnace; upon continued lowering of rod 17, disc 16 and body 10 will pass zone 28 and gradually be heated until they arrive in position II at the upper level of heating zone 29. As soon as sufficient heat has been absorbed by disc 16 at that temperature, it will be melted and almost instantaneously absorbed by the porous body 10. In continuing the downward travel through zone 29, the metal of previous disc 16, now within the pores of body 10, will be overheated to a predetermined extent and body 10 itself will be heated to the same temperature. Thereby the fluidity of metal within body 10 is increased and the melt given opportunity of completely filling all the pores of body 10. As soon as body 10 with the liquefied metal in it reaches position III where its bottom layer just leaves the heating zone 29, the temperature of that layer passes and falls below freezing temperature of the metal; consequently the metal in this layer freezes while the metal above it and within heating zone 29, is still liquid. Upon further lowering of body 10, layers above the bottom layer gradually leave zone 29, enter freezing zone 30 and freeze, and when body 10 with the absorbed metal in it has reached position IV, all the metal within it is frozen.

Fig. 3 illustrates this gradual freezing effect upon the liquid metal during the travel of body 10 from position III to position IV. First only a bottom layer up to level 32 is frozen, then another layer up to level 33, then the next following layer to level 34, and so forth as indicated in horizontal dotted lines. If there was gas entrapped in the still liquid bottom layer below level 32, it is given the possibility to rise into and through still liquid metal above level 32 within the pores of body 10; gas entrapped in the next upper layer reaching to level 33 is given an opportunity to rise through the still liquid metal on top within the pores of body 10 when the metal between levels 32 and 33 starts to freeze; and thus all the gas can rise into upper still liquid layers, eventually reach the top of body 10 and escape. Every time a metal layer freezes and thereby contracts, the entrapped gas is squeezed into the liquid metal on top of such freezing layer; in addition, such gas has the tendency to rise through the liquid metal because of its relatively little specific weight.

If there are oxides taken into the pores by the liquid metal or formed on the liquid metal, these oxides because of their smaller specific weight will rise through the still liquid metal in the pores, and also be taken along by the buoyant gases rising through the still liquid metal in the way just described. Thereby a self-cleaning is effected, and substantially all the oxides present or formed will ultimately accumulate on top of body 10 when all the liquid metal absorbed therein has gradually, layer after layer, been frozen while body 10 is being lowered from zone 29 into zone 30. The higher melting particles 11 remain of course solid during this heat treatment because their melting point is considerably higher than the temperatures applied for melting and overheating the metal. It will be appreciated that those "layers" are of course of almost infinitely small thickness, and are formed one on top of the other while the body is being lowered. Consequently, contractions in each such utterly thin layer, when freezing, will necessarily produce the results just described. Any minute voids if produced by the contraction of a just freezing lower layer, are immediately filled by still liquid metal of the upper layer.

It will be further appreciated that by extending the "liquid" zone 29 over a larger or smaller portion of the tubular furnace, and/or by regulating the speed at which body 10 is lowered through that zone, the freezing of subsequent layers in body 10 can be controlled and speeded up or slowed down at will.

It is of course understood that the same effect could be obtained by raising furnace 18 relative to body 10 and disc 16, or combining a lowering movement of body 10 and disc 16 with a rising movement of the furnace. The method described is, however, preferable for obvious reasons.

Instead of positioning disc 16 below body 10, it can be positioned on top of body 10; in any event, by the elementary action of capillary forces exerted upon the liquefied material of disc 16, the liquid metal in contact with body 10 will be absorbed.

Due to the fact that the amount of metal so to be absorbed can be predetermined, body 10 will be completely filled with it after the process according to the invention is completed. Due to some overheating of the liquid metal within the body, its uniform distribution within the body is secured. The finer the pores, i. e. the less porous the body is, the higher the temperature should be to which the metal is overheated so as to secure its flowing into all the empty spaces offered by the fine pores.

If the metal absorbed is capable of alloying with the higher melting substance of body 10, the temperature within zone 29 is to be adjusted in such a manner that not only proper fluidity of the metal and filling of the pores of the body is secured, but also sufficient time is given to accomplish alloying. Thus by adjusting the temperature and time of its application within zone 29, the extent of superficial alloying can be controlled. Since alloying can continue in the solid state after the liquid metal has filled the pores and is frozen, but still at high temperature, the slope of curve 24 or the law of heating the body filled with the metal within zone 30 is to be adjusted in such a manner that alloying or superficial diffusion in the solid state continues to predetermined and controlled extent. It is possible therefore that the part of curve 24 corresponding to zone 30 is to be steeper or more gentle than shown, in order to accomplish this result. To the same effect also the speed of travel of body 10 could be adjusted and controlled. However, a substantially constant speed of lowering the body through the furnace is preferred, particularly if a continuous process is to be performed as will be described later on. The temperature and time of keeping the metal at and above melting temperature within zone 29 are controllable, in the same way as after freezing close to or near, but below the melting temperature within zone 30. Thereby the extent of diffusion of metal into surface layers of the higher melting particles, and vice versa, can also be controlled.

In the method of producing a composite or agglomerated material or body as described with reference to Fig. 1, an individual batch is treated. It is possible, of course, to position on top of rod 17 any desired number of bodies 35, 36, 37, Fig. 4, above metal discs 38, 39 or below such disc 40, provided that all the porous bodies 35, 36, 37 are comprised of substantially the same higher melting particles and pressed to shape so as to form a coherent body which, if desired, is presintered, and further provided that discs 38, 39 and 40 are of substantially the same melting point. The porosity of the different bodies can be the same or vary to any desired, practical extent. Hence the ratios of the weights of the discs to those of the porous bodies need not be identical but such that upon melting and liquefying of the discs, the metal comprised by them completely fills the pores or voids within the coordinated porous body.

Instead of positioning the batches on top of rod 17, trays or intermediate supports 79, Fig. 4, can be used for more easily positioning the batches 12, 16 or 35—38, 37—39 and 40—36 on and removing them from the top of rod 17 or any other suitable support which can be lowered through furnace 18.

While in the foregoing a single or limited multibatch process has been described, it will be appreciated that a continuous multi-batch process can be performed by positioning a number of intermediary supports or vessels 79 one on top of the other and moving them at the same speed through the furnace. This is schematically illustrated in Fig. 5. In the interior of a furnace 41 temperatures corresponding to curve 42 are produced which may correspond to curve 24 in Fig. 2, resulting in an upper preheating zone 43, a zone 44 below, in which the metal of the disc is liquid, and a lowermost zone 45 at the upper end of which the liquid metal absorbed within the porous body is frozen to gradually rising levels and, after all the liquid metal has been solidified, is cooled down to a temperature at which the impregnated body can be removed at the lower end of the furnace. The batches are positioned in individual intermediary supports 46 open on top and provided with outlets for the gases and vapors contained in the voids of the porous body and developed in zone 44 and at the upper end of zone 45.

Fig. 6 shows more schematically an intermediary support 46 with a number of such outlets or escapes 47 on top.

Reverting to Fig. 5, it will be appreciated that the shaft of the furnace is first to be completely filled with a stack of empty intermediary supports 46, or refractory dummies, on top of which an intermediary support 46 containing a desired number, one os a minimum, of batches is positioned. Thereupon the stack is lowered at desired speed, and when the support 46 containing batches is just about to sink into the shaft, another support 46 with batches therein is positioned on its top, and so forth, until all the empty supports 46 have been discharged at the bottom of the furnace and only a pile of supports 46 containing batches to be treated are within and traveling downwardly through the furnace shaft.

Below the bottom of the furnace two sets of rollers 57, 58 are arranged, each set comprising three or more rollers. The rollers may be provided with projecting ribs, engaging grooves on the outsides of the intermediary supports.

When an intermediary support 46 is about to pass below rollers 57, it is engaged by another set of six or more rollers 58 arranged in the same way as the set of rollers 57. The pile of supports 46 with batches therein will sink by its weight through the furnace shaft, and it will suffice to brake the rollers to such an extent that a desired speed of the downward travel of that pile is adjusted. It is preferred, however, to connect the rollers through gears with a hydraulic or other adjustable power consuming appliance (water or oil pump driving the liquid in closed circuit the crosssection of which can be adjusted e. g. by a gate, or an electric generator working upon an adjustable resistance) which can more readily be regulated. Such brakes and apparatus are well known and therefore not shown.

Thus the rollers are driven in the direction of arrow 65 by the engaged supports 46, and each engaged empty and, thereafter, filled support 46 will be lowered and ultimately discharged by the roller sets 57, 58, and a continuous batch-process is realized.

Below furnace 41 an endless conveyor band 66 is arranged, running over rollers 67, 68 one of which is driven (not shown) at desired and adjustable speed and moves the conveyor band 66 in the direction of arrow 69. Therefore, each intermediary support 46 discharged by the roller set 58, will be dropped upon the conveyor band and moved to the right in Fig. 5 at such a speed that the next intermediary support 46 can be dropped upon the conveyor band when discharged from the roller set 58.

The outer surface of a batch so completed and taken from an intermediary support, can be superficially cleaned by sand blasting, polishing or grinding, as the case may be, in order to remove protuberances of metal, if any be present, or oxides cleared from the interior of the porous body during the manufacture as hereinbefore described. If there be any excess metal on top of the body, it may be either removed or left there for use in connecting the body, such as brazing or welding it upon a support.

If a coherent porous body is used which is only shared under proper pressure, up to about 2000 to 10,000 p. s. i., so that it can just be handled and positioned in a vessel open on top, a single batch-process is preferred. In this case the interior or cavity of vessel 79, Fig. 8, corresponds approximately to the shape of the pressed body, and it will be appreciated that the shape of the latter is retained by the cavity of body 79.

In such case it is often desirable to give that only pressed to shape body a presinter while it travels through zone 28, Fig. 2, or zone 43, Fig. 5 of the furnace. If the porous body is given a first presinter in a separate furnace, for instance push furnace of well known type, this first presinter should result in a larger porosity (smaller shrinkage) of the body if a second presinter is inevitable within zone 28 or 43 so that the porosity of the body resulting from these two subsequent presinters is the desired final one.

If it is intended to heat treat the body and/or metal absorbed, curve 24, Fig. 2, should be given a shape according to Fig. 9 where zone 70 is a preheating or presinter zone, 71 the liquid and overheating zone, 72 the gradual freezing zone according to the invention, 73 the heat treating zone in which proper annealing temperatures are produced, and 74 the cooling zone.

Since absorption of liquefied metal occurs with elementary force and, at proper temperature, quite fast, it is not always necessary to put the quantity of metal below or on top of the porous body. It may also be put on its side as is shown by way of exemplification in Fig. 7. There the portion of an intermediary support 75 is shown which is shaped at 76 so as to form an inclined seat for the quantity 77 of metal to be absorbed in the porous body 78. In order to reduce the amount of refractory material forming body 75, a great number of gas or vapor escapes 82 are formed therein.

It is also feasible to pour in a mold cavity of proper shape first a powder of the metal and on top powder of the higher melting particles, or vice versa, and to press them together so that a coherent body is obtained. This entity is then positioned e. g. in a support 79 of the type shown and herein described with reference to Figs. 4 and 8. Also in this case, as in all the others hereinbefore described, there will be saved a mixing step of the higher and lower melting powders in a ball mill or otherwise, as used in heretofore known processes. There will further be obtained the outstanding effect of the invention of removing all the gases or vapors contained in the porous body occluded to the higher melting particles or lower melting metal, of the gases or vapors formed during absorption, and a self-cleaning action as to those gases, vapors, oxides and other minute impurities of lower specific weight or density than the absorbed metal. With known processes the individual higher melting particles were dislocated and their uniform distribution disturbed; with the invention the skeleton body and melted infiltrant therein are at highest temperatures only for a relatively short period of time, and therefore dislocations are practically avoided and recrystallization or crystal growth of the higher melting particles is considerably reduced or avoided.

Intermediary supports 85, 86 may consist of carbon, graphite, a high refractory ceramic such as alumina ($Al_2O_3$, melting at 2050° C.), lime (CaO, melting at 2570° C.), spinell ($MgO.Al_2O_3$, melting at about 2130° C.), aluminum silicates such as sillimanite melting at about 1810° C., and mixtures of these or other high refractory materials. Sleeve or line 88 may consist of the same material and is preferably covered on its cylindrical inside with a high melting glaze such as of quartz glass (melting at about 1700° C.), mixtures of silica and alumina, silica and magnesia, silica and titania, etc. Of course, the sleeve may be fired so dense that no glaze is needed; if it be slightly porous, it may be dipped into a suspension of colloidal graphite (forming also a kind of lubricant) in water or of lampblack in ammonium hydroxide, so as to fill upon evaporation of the dispersion medium at least the pores of the inner cylindrical surface of the sleeve. Such glaze or carbon prevents the liquefied cast iron from entering the pores of the sleeve and facilitates the ejection of body 83 from the support after the process has been completed.

An intermediary support or tray of the type just described should be used in all cases in which the absorption of the just melted binder metal takes some time. Experience shows that some binder metals are not fluid enough at melting temperature for being absorbed almost instantaneously, particularly if a relatively small amount of binder metal is to be absorbed and consequently the pores of the absorbing body are extremely fine.

It is possible to perform the process of the invention in open air.

It is preferred, however, to pass in performing the invention, through the upright confined space of the furnace a protective gas, such as dry hydrogen, preferably entering that space at its lower end and leaving it at its upper end.

It is also possible to produce a vacuum within that space.

In the following a few examples of compositions, temperatures and time periods of the various heat treatments shall be given, without limiting the invention to those exemplifications or any particular type of furnace used.

Taking a cylindrical body consisting of 80% by weight of low carbon steel (containing about 0.5% carbon) and 20% by weight of cast iron (containing about 4% carbon), steel or steel scrap is comminuted to an average particle size of about 80 to 3 microns diameter, or less, admixed with about 1% to 2% by weight of paraffin in a tumbler, and pressed under commercial pressure (about 10,000 to 50,000 p. s. i.) into a cylindrical body 83, Fig. 8, the volume of which exceeds by about 20% that of a cylinder of same diameter consisting of dense steel; then 20% of the volume of that cylinder form pores. 20% by weight of virgin or scrap cast iron are cast or pressed from powdery cast iron into a dense disc 84 and positioned on top or below the porous cylinder 83. Body 83 in contact with disc 84 is positioned in an intermediary support or tray 85 of refractory material having a bottom 86 and a cavity 87 preferably lined with a sleeve 88 the inner diameter of which slightly exceeds that of body 83 and disc 84. 47 are outlets for gases or vapors the same as described hereinbefore with reference to Fig. 6.

Tray 85 is now introduced into the confined space of the furnace and moved downwardly therethrough progressively at suitable low speed, for instance, ½" per minute. While the tray with porous body 83 and disc 84 passes heating zone 28 or 70 (Figs. 2, 9) the body and disc are gradually heated to about 1170° C. at which the disc melts. Within the following heating zone 29 or 71, the temperature is raised to about 1300° C. and lowered again to about 1200 to 1225° C. Within the upper part of zone 30 or within zone 72, the temperature is gradually lowered for instance to 1130° to 1100° C. and over the lower balance of zone 30 or within zone 74 first more steeply and then more gently to about 35° to 100° C. When body 83 and disc 84 reach the lower end of zone 28 or 70, melting, overheating and infiltration of the cast iron occurs; while the infiltrated cast iron melt is gradually frozen within the skeleton steel body, degasification and cleaning are effected as described above with reference to Fig. 3. While the skeleton steel body and cast iron melt absorbed therein travel downwardly through zone 29 or 71 (Figs. 2, 9) diffusion sets in of some carbon contained in the cast iron melt into the solid steel particles, primarily into contacted surface layers of the steel particles; the depth of diffusion depends upon the time period during which the infiltrated cast iron melt is in contact with the steel skeleton, and the prevailing temperatures. Thereby the carbon content of the cast iron melt is somewhat reduced and its freezing temperature increased, say to 1200 to 1225° C. Therefore the batch containing the cast iron melt is exposed to a temperature of about 1225° C. when it enters zone 30 or 72, and this temperature is gradually decreased while the batch continues to travel downwardly progressively so that heat is abstracted from the melt and it is frozen to gradually rising levels to the effects previously stated. During continued downward travel through zone 30 or 72, the batch is cooled further and diffusion of carbon from the solidified cast iron into the steel skeleton continues though at decreased rate. By properly dimensioning the respective heating and heat abstracting or cooling zones, respectively, furthermore by properly devising the respective temperatures, and lastly by proper choice of the speed of the progressive downward movement of the batch, it is possible to control the extent of diffusion of carbon from the infiltrated cast iron into the steel particles and thereby to obtain finally an agglomerated or composite body in which carbon is more or less uniformly distributed. By adding a heat treating zone 73 between the first heat abstracting zone 72 and the final cooling zone 74, Fig. 9, and maintaining therein, for instance, a temperature between 800 to 900° C., any desired structure, such as a steel like structure can be applied to the body. In particular, in zone 74, Fig. 9, the temperature can be reduced to below about 723° C. and thereafter slowly to below 500° C. in order to impart to the body a steel like structure consisting of pearlite, cementite and a kind of iron matrix. The lowermost portion of zone 30 or 74 can be water cooled, if desired.

By the use of steel or alloy steel particles of desired composition and cast iron in proper proportion, any other kind of steel or alloy steel, and of more or less homogeneous structure can be obtained.

It will be appreciated that the porous body 83 can be impregnated with smaller or larger amounts of cast iron. If the amount be larger but below 50% by weight of the final body, the use of an intermediary support as shown in Fig. 11 is advantageous. Support 93 is provided with a downward tapering, larger upper portion 94, and escapes 96 for gases and vapors of large area so as to reduce the volume and heat capacity of the support. The lower inner portion of the support forms a cavity in which a pressed to shape body 83 of large porosity is positioned; it may even consist of a pile of steel particles, poured or tamped into the cavity so that it exhibits the desired porosity. In the conical upper portion 94 cast iron scrap 95 is positioned, if necessary after powdering to some extent.

Take as another example Monel metal containing about 67% nickel, 28% copper and small amounts of other metals, such as iron and manganese, or 67% nickel and 33% copper, having a melting point of about 1225° and 1245° C., respectively. It will be appreciated that by the addition of about 20% copper, by weight of the final body, a material can still be obtained which exhibits the characteristics of Monel metal. By using scrap of Monel metal e. g. of the compositions stated, comminuting it to an average particle size of between about 80 to 3 microns, and pressing the powder to desired shape under commercially available pressures, as exemplified in the first example, a coherent and porous body is obtained suitable for the purposes of the invention. A quantity of copper of 20% of the final body's weight is positioned on top of or below body 83.

Now the support with the batch therein is lowered through the furnace shaft in the manner described above, and within zone 28, 43 or 70 the batch traveling downwardly through the shaft is heated to about 1083° C. where the copper melts. Within zone 29, 44 or 71 the batch is slightly overheated and cooled again. While traveling downwardly through the uppermost part of zone 30, 45 or through zone 72, the batch is gradually cooled to about 950° to 975° C. so that the copper absorbed in body 83 is frozen to gradually rising levels to the effect of the invention. Within the subsequent part of zone 30 and 45 or within zone 74 (the heat treatment zone 73 being omitted) the batch is cooled so that it can be discharged from the furnace.

While the batch is cooled so that the copper melt freezes to gradually rising levels within body 83, the effects of the invention as previously stated are attained. Any oxide formed on the copper during heating or, if scrap of copper is used, present on the latter is decomposed shortly before the copper is melted and the oxygen escapes. Copper-suboxide also melts while the batch is slightly overheated within zone 29, 44 or 71 and rises due to its lower specific weight to the top of body 83.

The absorbed molten copper will alloy superficially with the Monel metal particles. If the formation of the alloy and homogenization of the batch is to be extended, a heat treatment zone 73 can be used of proper length, and the temperature within zone 73 held between about 700° to 750° C.

As another example a class of metals and alloys should be considered, consisting of cast iron, steel or alloy steel as the higher melting substances and brass or bronze as the lower melting alloy. By the use of scrap of steel and cast iron, comminuting it, if necessary, to an average particle size of about 80 to 3 microns, and briquetting it under commercial pressure, or tamping a pile of it into the cavity of a support of the type shown in Fig. 11, a body or shaped mass can be obtained having a desired porosity. In general considerably more than 50% of the volume of the body should consist of the particles, the remainder of the body forming pores.

The batch is then lowered through the furnace shaft, and if brass of the specific composition stated is used, the batch is heated in zone 28, 43 or 70 to almost 960° C.; upon entering zone 29, 44 and 71, the temperature of 960° C. is passed and raised above 960° C. so that the brass melts and is absorbed by the porous ferrous body. The temperature within that zone may be increased to about 1150° C. if cast iron is concerned, and to about 1250° C. if steel or alloy steel is concerned, and lowered again within that zone to above about 920° C. where the specific brass stated freezes. Upon traveling downwardly in the uppermost part of zone 30 or 45, or into zone 72, the temperature is gradually lowered to about 850° C. so that the brass absorbed by the body is frozen to gradually rising levels according to the invention; a brass of the composition stated freezes at about 920° C. Subsequently the body is cooled in zone 30, 45 or 74; a heat treating zone 73 can be applied, if desired, in which a temperature of about 400° to 600° C. should be maintained in order to homogenize the bronze network within the quite uniformly distributed iron particles.

The material thus obtained is usable for bearings and other machine elements of similar purpose, and forms a suitable substitute for pure brass in many applications.

In the foregoing example bronze can be taken instead of brass, and in such case the batch is heated in zones 28, 43 or 17 to about 880° C. only; upon entering zones 29, 44 and 71, the temperature of 880° C. which is the melting temperature of the specific bronze stated, is passed and further raised to about 1150° if a porous body of cast iron is concerned, and to about 1180° to 1200° C. if it comprises steel or alloy steel particles, and lowered again within that zone to above about 800° C. where the specific bronze freezes. Upon further traveling downwardly through the uppermost part of zone 30 or 45, or through zone 72, the temperature is gradually lowered to about 800° C. so that the brass absorbed by the porous body is frozen to gradually rising levels according to and with the effects of the invention, and therafter the batch is cooled in zone 30, 45 or 74 to a temperature at which it can be discharged from the furnace.

Also in this example a material will be obtained which is suitable as a substitute for pure bronze and permits considerable saving of the latter, on one hand, and the use of scrap iron and steel, on the other hand. If iron and a bronze are used, the latter of copper contents as exemplified above, e. g. a valve material is obtained suitable for controlling many fluids, such as steam and overheated steam; if a bronze is used of a copper content of around 80% to 84%, the resulting material can be used, for instance, for bearings, gears, etc. The oxides usually formed on the surface of the scrap are removed while the batch is processed according to the invention, and particularly if a deoxidizing atmosphere is applied. If no such atmosphere is intended to be used and the process is performed in a vacuum or even in open air, deoxidizing agents may be admixed in finely divided state either to the scrap while it is comminuted to desired particle size or to the bronze, such as of the type of titanium, magnesium and manganese, in the amount of a fraction of one percent or a few percent by weight of the final body.

As another example an agglomerated body may be taken to be manufactured from brass, e. g. of a composition of 70% copper and 30% by weight zinc and having a melting point of 960° C., as the higher melting substance, and aluminum having a melting point of about 658° C. as the lower melting metal. Because of the low specific gravity of aluminum compared with that of brass, it is preferred to position the aluminum in the form of a disc which is cast individually or sliced off a bar of corresponding cross-section, or pressed to shape from a powder, below the porous body of brass.

In performing the process according to the invention, the batch will be lowered through zone 28, 43 or 70 at a speed of about ½" per minute and heated to almost 658° C.; upon entering zone 29, 44 or 71, the temperature of 658° C. is passed and raised to about 700° C. so that the aluminum melts and is quickly absorbed by the porous body of brass, and the temperature within that zone is then lowered again to almost 658° C.; upon traveling downwardly through the uppermost part of zone 30 or 45, or into zone 72, the temperature is gradually lowered to about 600° C. so that the aluminum melt absorbed in the porous body or pile is frozen to gradually rising levels according to the invention. Subsequently the body is cooled in zone 30, 45 or 74. A heat treating zone 73 may be interpolated to advantage, wherein the temperature is held between about 200° to 300° C. Thereby the hardness of the absorbed and frozen aluminum can be increased if so desired.

It will be appreciated that in the manner described scrap or waste of brass, bronze, etc., can be used in manufacturing bodies of a shape which can be used immediately, and do not require subsequent and expensive machining. Surface layers comprised of excess lower melting metal, oxides and other impurities can be easily removed by brushing them off, sand blasting, etc., which are neither expensive nor considerable time taking steps. In some cases it suffices to tumble the completed bodies in well known manner so as to remove the quite loosely adhering impurities and oxides.

It should also be understood that the cylindrical bodies mentioned hereinbefore and illustrated in the drawings are only taken for the purpose of simplicity of illustration and calculation; any other shape of the bodies can be used, particularly of electrical contacts and electrodes, hard metals, and symmetrical shapes such as of annular valve seats, disc-like valve tops, annular bushings and bearings, etc.

As another example an annular body intended to be used as a bushing for a bearing may be considered, consisting of graphite and brass.

Graphite is admixed with an organic binder, pressed to the shape of a porous body of required volume, and in contact with a body (such as a disc) of brass of a volume to fill completely the pores of the graphite body (if the final body should be solid) or of a somewhat smaller volume (if the final body should still be porous), lowered progressively through the furnace shaft whereby the organic binder is evaporated and thereafter the brass melted, infiltrated and thereupon frozen to gradually rising levels according to the invention. The graphite particles are preferably of colloidal particle size, in order to avoid displacements by the brass melt. Instead of brass, a metal or alloy of lower specific density, such as aluminum, or an aluminum alloy, can be used.

Another method of producing porous or non-porous bodies containing considerable amounts of graphite, such as from about 5% to 20% by weight of the final body, which acts as a solid lubricant, consists for instance in the following. 5 units by weight of graphite preferably of colloidal size of its particles are admixed by dry tumbling with about 15 to 60 units by weight of iron powder of 100 mesh (or smaller) particle size, the mixture pressed to shape of a rod 89, Fig. 10, and the latter presintered preferably in a neutral atmosphere, such as a carbon-dioxide atmosphere, at about 900° C. for about 10 to 30 minutes. The presintered rod which is of controlled porosity is then subdivided into slices 91 by slicing the rod 89 along planes 90 whereby individual porous bodies 92 are obtained. Depending on the temperature of the presinter and its duration, also on the particle size of the added iron (cast or sponge iron), the porosity of the body will amount to between 20% to 50% by volume. A quantity by weight of babbitt metal sufficient to fill these pores is shaped into a body of rectangular cross-section the same as body 92, and positioned above or below body 92 in a support e. g. as shown in Fig. 8; if the babbitt metal be powdery, body 92 is positioned in a cavity of a support 93, Fig. 11, and the powdery babbitt metal filled into the conical upper part 94.

The batch placed in a support is then treated according to the invention, by heating it first up to and above (preferably by about 100° to 300° C.) the melting temperature of the Babbitt metal, so that it is absorbed by and uniformly distributed in the porous body which stays solid, and thereafter freezing the absorbed melt within the porous body to gradually rising levels, whereupon the body is cooled.

It will be appreciated that by using a quantity of babbitt metal the volume of which is smaller than that of the total of the pores of the porous body, the final body will still be porous to a controlled extent, and can be soaked with oil. If the final body be dense, it will still be usable as a self-lubricating bushing or bearing due to the presence of the graphite.

Instead of iron, any other metal capable of sintering at temperatures preferably not exceeding about 1000° to 1100° C. can be used. Instead of Babbitt metal which exhibits desirable qualities for bearings, other metals or alloys, such as brass, can be used for the same purpose. Of course, the graphite content can also be varied, depending on the purpose of and load on the bearing or bushing.

It should be understood that a bar of rectangular cross-section has been illustrated only for simplicity's sake. Instead, for instance, a porous tube can be extruded or pressed to shape and presintered, and annular pieces of desired thickness and the size of the bushing sliced therefrom. The porous coherent piece is then impregnated fully or partly with the lower melting metal or metal composition.

It is also understood that a protective atmosphere of any suitable kind can be used in processing the agglomerated bodies according to the last examples, and alloying can be controlled.

It will be understood that the invention is not limited to any example given above but is to be derived in its broadest aspects from the appended claims. If in the latter reference is made to a substance having a considerably higher melting point than the agglomerated metal, it should be understood that any metal or metalloid, including solid carbon in its various forms, and compounds or alloys thereof are comprised by this term which are suitable for a composite or agglomerated structural material.

What I claim is:

1. In a method of producing a composite or agglomerated structural material and shaped bodies thereof comprising a major portion by volume of minute particles of at least one substance having a considerably higher melting point than a minor portion by volume of at least one metal agglomerating said particles, the steps of forming from particles of said substance a body having intercommunicating pores, contacting said porous body with said metal in an amount at least sufficient to fill the pores of said body, slowly moving said porous body and metal in contact therewith downwardly through an upright confined space, heating said space so that the temperatures therein measured from its top downwardly, rise to a maximum temperature equalling at least the melting temperature of said metal but considerably below the melting temperature of said substance and thereafter gradually decrease considerably below the freezing temperature of said metal, so that said body and metal in contact therewith are heated accordingly while traveling downwardly through said space, said metal is melted and infiltrated in said body and fills its pores, and thereafter heat is abstracted gradually from that body and infiltrated metal therein and the latter is gradually frozen from the bottom of said body to its top.

2. In a method as set forth in claim 1, heating said confined space so that the temperatures therein, measured from its top to the bottom, first rise gradually at least to the melting temperature of said metal but considerably below the melting temperature of said substance, and thereafter decrease gradually below the freezing temperature of said metal and thereafter near to room temperature, so that after gradual freezing of the infiltrated metal from the bottom of said body to its top, said body and frozen metal therein are further cooled.

3. In a method for producing a composite or agglomerated structural material and shaped body thereof, comprised of a major portion by volume of minute particles of at least one substance having a considerably higher melting point than a minor portion by volume of at least one metal agglomerating said particles, the steps of shaping under pressure a coherent and porous body of minute particles of said higher melting substance, the size of said body being a multiple of that of a final body and its cross-section being similar to that of said final body, presintering said body so that it shrinks but retains its intercommunicating pores, subdividing said presintered body into individual porous bodies of a shape similar to that of said final body, contacting such individual porous body with lower melting metal in a quantity sufficient to at least fill the pores of said individual body, slowly moving said individual body and metal in contact therewith downwardly through an upright confined furnace space, heating said space so that the temperatures therein rise from its top downwardly to a maximum temperature equalling at least the melting temperature of said metal but considerably below the melting temperature of said substance and thereafter gradually decrease considerably below the freezing temperature of said metal, so that said body and metal in contact therewith are heated accordingly while travelling downwardly through said space, said metal is melted and infiltrated in said body and fills its pores, and thereafter heat is gradually abstracted from said body and infiltrated metal therein and the latter is gradually frozen from the bottom of said body to its top.

4. In a method as set forth in claim 1, heating said confined space in such a manner that the temperature therein rises to a maximum temperature above the melting temperature of said metal but considerably below the melting temperature of said substance so that said metal is melted and its liquidity increased.

5. In a method as set forth in claim 1, heating said confined space so that the temperatures therein, measured from its top to the bottom, first rise gradually at least to the melting temperature of said metal but considerably below the melting temperature of said substance, then decrease gradually below the freezing temperature of said metal and thereafter to temperatures below said freezing and above room temperature which promote at least superficial diffusion in the solid state between the infiltrated frozen metal and the particles of said substance.

6. In a method as set forth in claim 1, heating said confined space so that the temperatures therein, measured from its top to the bottom, first rise gradually at least to the melting temperature of said metal but considerably below the melting temperature of said substance, are kept within said last mentioned range over a distance sufficient to cause predetermined diffusion between said infiltrated metal melt and said particles at least in contacting surface layers, and thereafter decrease gradually below the freezing temperature of said metal.

7. In a method as set forth in claim 1, maintaining a protective atmosphere within said confined space.

8. In a method of producing a composite or agglomerated structural material and shaped bodies thereof comprising a major portion by volume of minute particles of at least one substance having a considerably higher melting point than at least one metal agglomerating said particles, the steps of forming from particles of said substance a plurality of bodies having intercommunicating pores, contacting each porous body with said metal in an amount at least sufficient to fill the pores of said body, placing at least one such body and metal in contact therewith in the cavity of a refractory tray the height of which exceeds that of said body and metal, slowly moving said tray with porous body and metal in contact therewith downwardly through an upright confined space, positioning successively upon a tray moving downwardly another tray containing at least one porous body and metal in contact therewith, so that said confined space is eventually filled with said trays each containing at least one porous body and metal in contact therewith and moving slowly and progressively downwardly through said space, heating said space so that the temperatures therein measured from its top downwardly, rise to a maximum temperature equalling at least the melting temperature of said metal but considerably below the melting temperature of said substance and thereafter gradually decrease considerably below the freezing temperature of said metal, so that each body and metal in contact therewith within a tray are heated while travelling downwardly through said space, said metal is melted and infiltrated in each body and fills its pores, and thereafter heat is abstracted gradually from each body and infiltrated metal therein and the latter is gradually frozen from the bottom of said body to its top.

PAUL SCHWARZKOPF.

REFERENCES CITED

The following references are of record in the file of this patent:

UNITED STATES PATENTS

| Number | Name | Date |
|---|---|---|
| 2,205,865 | Schwarzkopf | June 25, 1940 |
| 2,225,424 | Schwarzkopf | Dec. 17, 1940 |
| 1,853,385 | Spade | Apr. 12, 1932 |
| 1,902,478 | Wiegand | Mar. 21, 1933 |
| 2,096,252 | Koehring | Oct. 19, 1937 |
| 2,192,792 | Kurtz | Mar. 5, 1940 |